Aug. 30, 1960 W. C. LOTHROP 2,950,562
CRUSTACEAN TRAP
Filed July 2, 1958

INVENTOR.
Warren C. Lothrop
BY Bessie A. Lipper
ATTORNEY

United States Patent Office 2,950,562
Patented Aug. 30, 1960

2,950,562

CRUSTACEAN TRAP

Warren C. Lothrop, Newton, Mass., assignor to Arthur D. Little, Inc., Cambridge, Mass., a corporation of Massachusetts Filed July 2, 1958, Ser. No. 746,272

5 Claims. (Cl. 43—102)

This invention relates to lobster traps and more particularly to traps which are not affected by those factors which now contribute to the rapid destruction of the presently used wooden traps.

Lobster fishermen now employ one of two types of wooden traps, one being a rectangular box type and the other having a flat rectangular base with bowed sides and top. Webbed funnels or heads serve as the entrance for the lobsters into the trap and prevent their subsequent egress. In these presently used wooden traps the bait is placed in a mesh bait bag or suspended on a bait hook in the center of the trap.

The present wooden traps possess certain inherent disadvantages. First, because they are constructed of wood slats, they have little resistance to damage brought about by storms, heavy seas and ground swells. Because of this, the trap may be lost completely, damaged in such a manner as to lose the catch, or damaged to the extent that major repairs are required.

A second disadvantage of the present traps is that they are attacked by vermin or living organisms in the water. The nature and extent of this type of damage varies from location to location. Where vermin damage is a major consideration, it is not unusual for a trap to be so damaged as to be made useless within a year's service.

A third major disadvantage of the present wooden traps is that they become easily water-logged. Even a trap which has been well painted may become so waterlogged after a season's use that it requires several years of drying before it can be used again.

The overall effect of these disadvantages inherent in wooden lobster traps can best be illustrated by the fact that from 50 to 70% of all lobster traps in service must be replaced yearly.

The present lobster traps possess other disadvantages which affect their ease of handling and their effectiveness as traps. Thus for example, it is difficult for the lobster fisherman to rebait the present traps since the bait must be placed in a net or on a hook located in a fixed position within the trap. When this must be done in a small craft at sea, it can be a difficult and time-consuming operation. Furthermore, the present lobster traps do not always remain right side up once they are located, and if they are tipped, one or more of the lobster entrances may be blocked, thus materially reducing or even eliminating their effectiveness as traps.

It will be seen from the above that it would be desirable to have a lobster trap which is not subject to damage by the elements or by living organisms, and which at the same time would always be effective as a trap.

It is therefore an object of this invention to provide a lobster trap which is substantially unaffected by the damaging effects of storms, heavy seas, ground swells and other elemental disturbances. Another object is to provide a lobster trap which is not subject to vermin attack or to water-logging. It is a further object to provide a lobster trap which is highly effective as a trap in that it will remain right side up and will not be subjected to being tossed about and moved from its location. It is still another object to provide a lobster trap which may be easily baited and likewise easily unloaded of the lobsters trapped therein.

These and other objects will be apparent in the following discussion.

The lobster trap of this invention may be further described with reference to the accompanying drawings in which.

Figure 1:
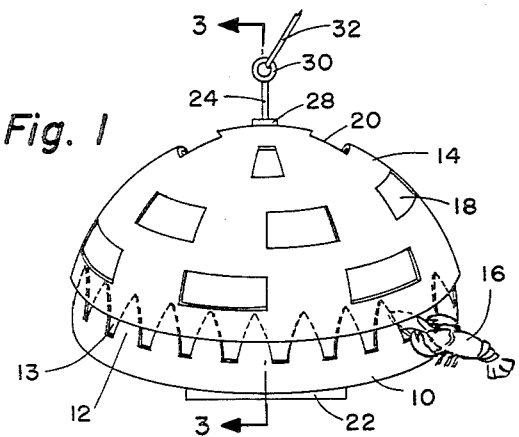
Fig. 1 is a drawing of a lobster trap constructed in accordance with this invention showing the manner in which a lobster enters the trap.

In Figs. 1 and 3-6, a semi-spherical trap is shown. The trap consists of base 10, from the top of which flexible strips 12 extend. These strips 12 are slightly bowed inwardly and held in place by top portion 14. Because of the flexibility of springiness of these strips 12 they may be easily pushed by the lobster toward the interior of the trap thus permitting the lobster to enter as shown in Fig. 1. Strips 12 may be in contact with each other, or may preferably be separated by spacings 13 to permit easier ingress of the lobsters and saving of materials. If spaced apart, they should of course be so spaced that legal sized lobsters cannot slip through them to escape. The top portion 14 of the trap consists of a bowl-shaped member which extends outside and below the upper tips of bowed strips 12. This upper member 14 serves both as the top portion of the trap and as a means to confine the bowed strips 12 in the position illustrated. This permits the strips 12 to be bent inwardly to permit the entrance of lobster 16 into the trap, but the upper member 14 prevents the bowed strips 12 from being bent outwardly to release the lobster.

Top portion 14 is provided with suitable openings 18 to minimize water resistance and to permit under-sized lobsters and small fish to escape. The top portion 14 also has openings 20 which permit bait containers 21 to be inserted and removed. These bait containers 21 may be preloaded before the fishing vessel sets out and are quickly interchangeable for resetting the trap. The distance between the rim of upper member 14 and base 10 must be great enough to permit the passage of a lobster. Since there may be an upper legal limit to the size of a lobster, the dimensions of the trap, i.e., the length of strips 12 and the spacing between them, may be fixed to avoid trapping over-sized lobsters.

Affixed to the bottom of base 10 are weights 22 which are heavy enough to maintain the trap right side up under all conditions. The bottom and top portions of the trap are maintained in the desired relationship to each other through a shaft 24 which passes through the center of upper member 14 and through base 10 and if desired through to weight 22. The shaft is affixed permanently to base 10 through such means as collar 26. The upper member 14 is held firmly against bowed strips 12 when the trap is in use by any suitable means such as a nut or clamp 28 which conveniently screws on shaft 24. When the trap is to be unloaded, nut 28 is unscrewed and top 14 is free to slide up and down on shaft 24 permitting access to the bottom portion of the trap. Shaft 24 may be provided with any suitable means such as ring 30 to which line 32 can be attached.

Alternatively, the openings 20 into which the bait containers 21 are inserted may be large enough to permit removal of the trapped lobsters without raising the entire top portion 14.

Figure 2:
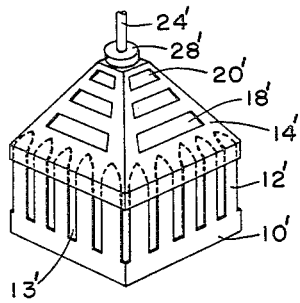
Fig. 2 is a modification of the trap of this invention.
Figure 3:
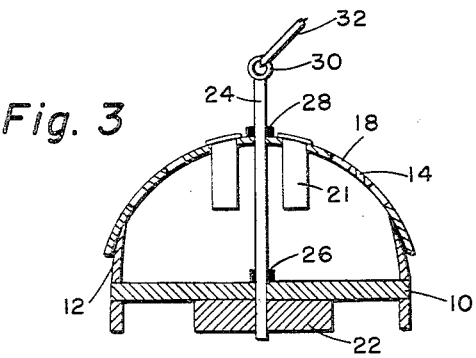
Fig. 3 is a cross-section of the lobster trap of Fig. 1 taken along line 3—3 of Fig. 1.
Figure 5:
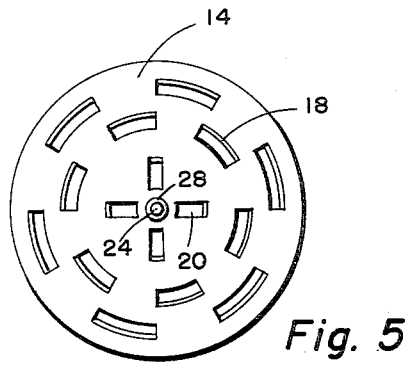
Fig. 5 is a top plan view of the trap of Fig. 3.
Figure 4:
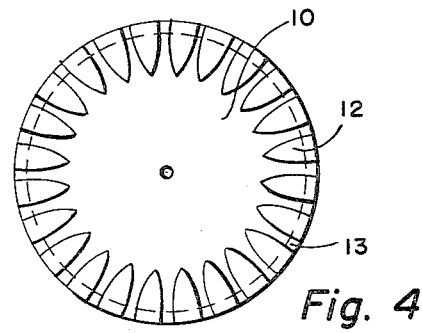
Fig. 4 is a top plan view of the bottom portion of the trap showing how the strips forming its sides are bent inwardly.
Figure 6:
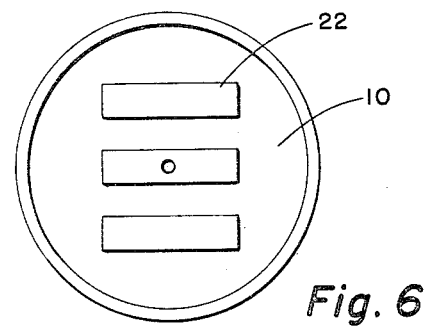
Fig. 6 is a bottom plan view of the trap of Fig. 3.

Although it is probably more desirable from a fabrication point of view to construct the trap in the semispherical form illustrated in Fig. 1, it would also, of course, be possible to employ other geometric forms. One of these forms is illustrated in Fig. 2 wherein the base is square and the top portion is in the form of a pyramid. The parts of the trap illustrated in Fig. 2 correspond to those of Fig. 1 and have been given the same reference numerals with a prime.

The lobster trap illustrated in these figures lends itself to being constructed from material other than wood and hence provides the possibility of eliminating damage done by high seas, ground swells, water-logging and living organisms. More particularly, the trap may be constructed of a durable plastic material which not only eliminates the disadvantages of the presently used traps but also provides the possibility of being inexpensively molded or cast in a minimum number of parts. For example, the base 10 with bowed strips 12 may be formed as a single piece and the upper member 14 may be formed as another single piece with the necessary openings and ports.

The removable bait containers are so designed that extra ones may be loaded prior to running the traps and may be slipped into place when the empty ones are removed. Thus the rebaiting of traps even under adverse circumstances is easily accomplished. Moreover, the time now spent in baiting traps at sea can be saved or used to better advantage by preparing the traps on land.

Plastic of synthetic materials which would be suitable for the construction of the lobster trap of this invention include, but are not limited to, such materials as the polyolefins (polyethylene, polypropylene, etc.), the polyesters, the acrylics, polyvinyls, and the like. These materials may, of course, be reinforced with glass and the like. In general any material which possesses sufficient structural strength, is flexible, and resistant to long exposure in water and to such marine borers as the teredo is suitable for the crustacean traps of this invention.

It will be seen from the above description that this invention provides a trap which is not subject to the disadvantages inherent in the present wooden lobster traps. Moreover, the trap is capable of maintaining maximum effectiveness under all foreseeable conditions.

I claim:
1. A crustacean trap, comprising a base, a plurality of contiguous flexible strips of substantially equal length extending upwardly from the periphery of said base, and a downwardly concave top member the edge of which overlaps the upper ends of said flexable strips and extends sufficiently below the tops of said strips to prevent them from being forced outwardly, said strips yieldably bearing against the inner edge of said top member whereby said strips may be forced inwardly by a crustacean to provide an opening into said trap.

2. A crustacean trap in accordance with claim 1 further characterized by being provided with apertures of such dimensions that under-sized lobsters can escape therethrough.

3. A crustacean trap in accordance with claim 1 further characterized by having ports in said top member and removable bait containers depended within said trap through said ports.

4. A semi-spherical lobster trap, comprising a round base, a plurality of contiguous flexible strips of substantially equal length extending upwardly from the periphery of said base and slightly bowed inwardly, a circular bowl-shaped top member surrounding the upper ends of said flexible strips and extending sufficiently below the top of said flexible strips to prevent them from being forced outwardly, said strips yieldably bearing against the inner edge of said top member whereby said strips may be forced inwardly by a lobster to provide an opening into said trap, the distance between the rim of said top member and the periphery of said base being great enough to permit the passage of a lobster when at least one of said strips is forced inwardly.

5. A lobster trap in accordance with claim 4 further characterized by being provided with a supporting shaft affixed to the center of said base and extending upwardly through the center of said top member, said top member being slidable upon said shaft.

References Cited in the file of this patent

UNITED STATES PATENTS

| | | |
|---|---|---|
| 200,574 | Schreiber et al. | Feb. 19, 1878 |
| 1,286,661 | Langdale | Dec. 3, 1918 |

FOREIGN PATENTS

| | | |
|---|---|---|
| 573,887 | France | Mar. 20, 1924 |
| 532,931 | Canada | Nov. 13, 1956 |
| 779,023 | Great Britain | July 17, 1957 |